INVENTORS
CARL H. DEAL
MICHAEL N. PAPADOPOULUS
BY William H. Myers
THEIR AGENT

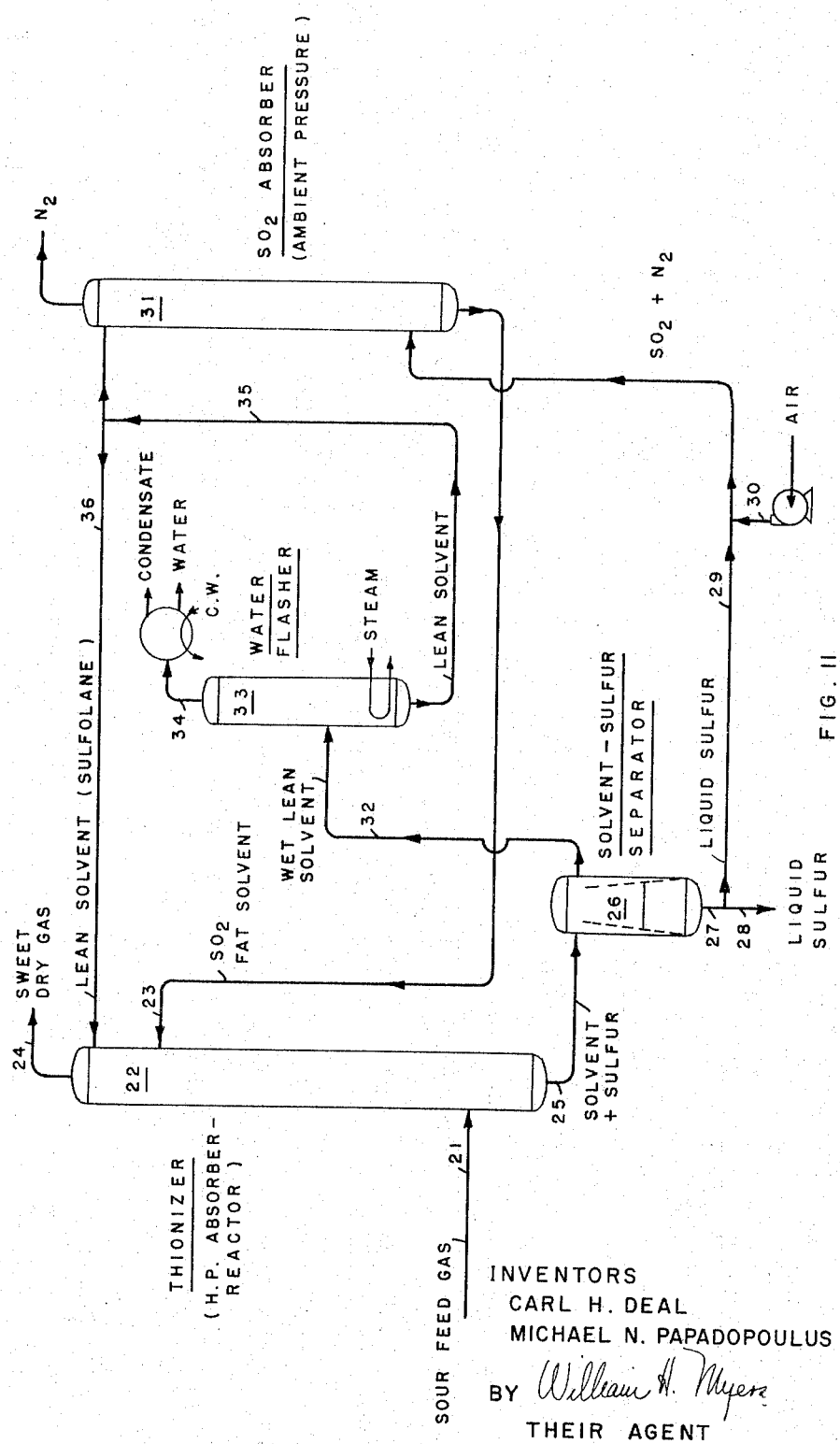
FIG. II
INVENTORS
CARL H. DEAL
MICHAEL N. PAPADOPOULOS
BY *William H. Myers*
THEIR AGENT

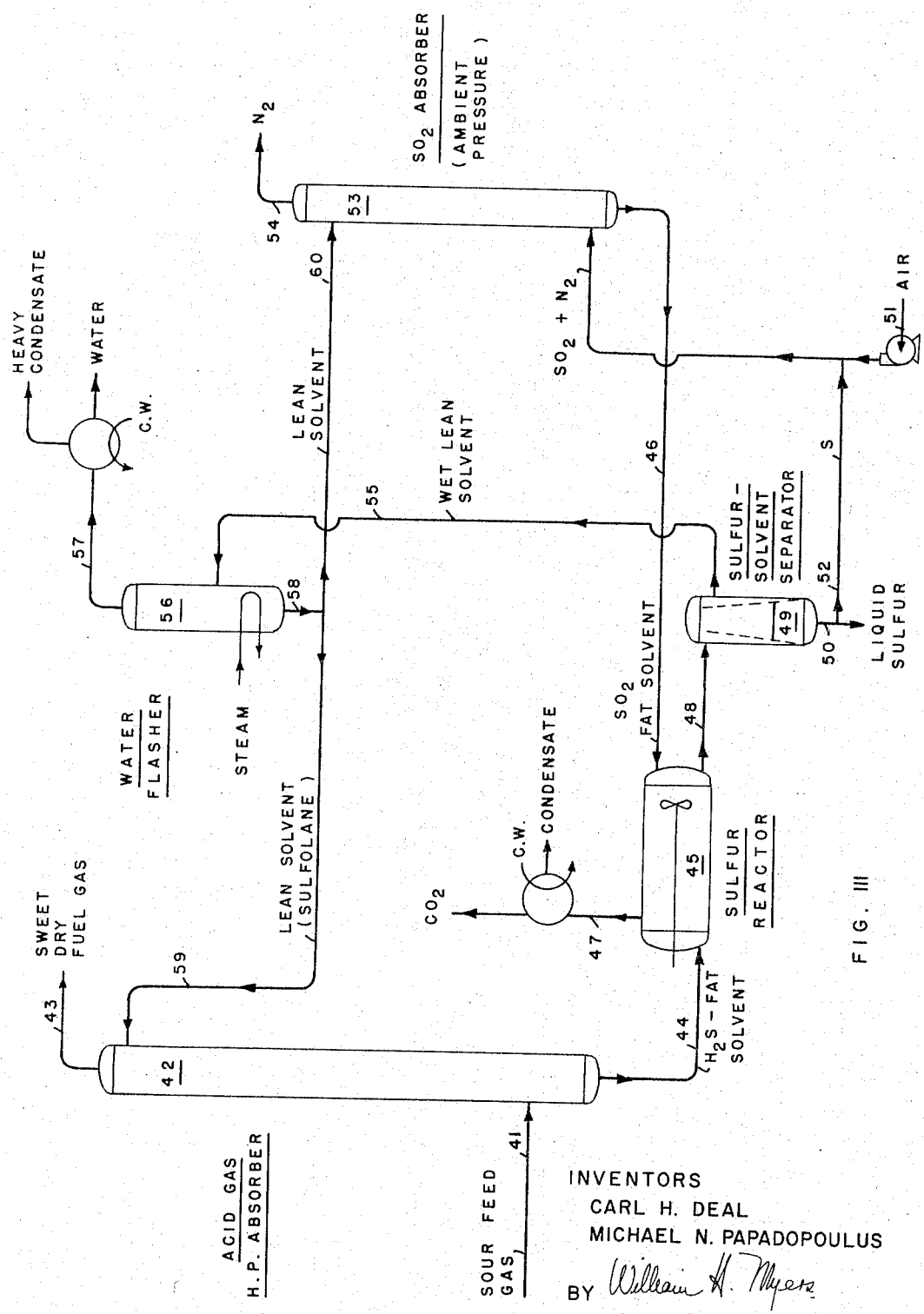
FIG. III

United States Patent Office 3,363,989
Patented Jan. 16, 1968

3,363,989
METHOD OF REMOVING SULFUR CONTAINING GASES FROM GASEOUS MIXTURES AND RECOVERING SULFUR THEREFROM
Carl H. Deal, Jr., Orinda, Calif., and Michael N. Papadopoulos, Alton, Ill., assignors to Shell Oil Company, New York, N.Y., a corporation of Delaware
Continuation-in-part of application Ser. No. 190,160, Apr. 25, 1962. This application Nov. 4, 1965, Ser. No. 513,628
9 Claims. (Cl. 23—225)

ABSTRACT OF THE DISCLOSURE

A process for removing $H_2S$ from gaseous mixtures with subsequent sulfur formation therefrom by (a) contacting the gaseous mixture with an absorbent comprising (1) a sulfone, (2) water, (3) a ferrous salt and (4) a pyridine carboxylic acid, (b) injecting $SO_2$ into the $H_2S$ fat absorbent thereby causing $H_2S$ and $SO_2$ to react to form sulfur and $H_2O$, (c) separating sulfur from the absorbent and $H_2O$, (d) separating the $H_2O$ formed in step (b) from the absorbent and (e) recycling the absorbent back to step (a).

---

Figure 1:
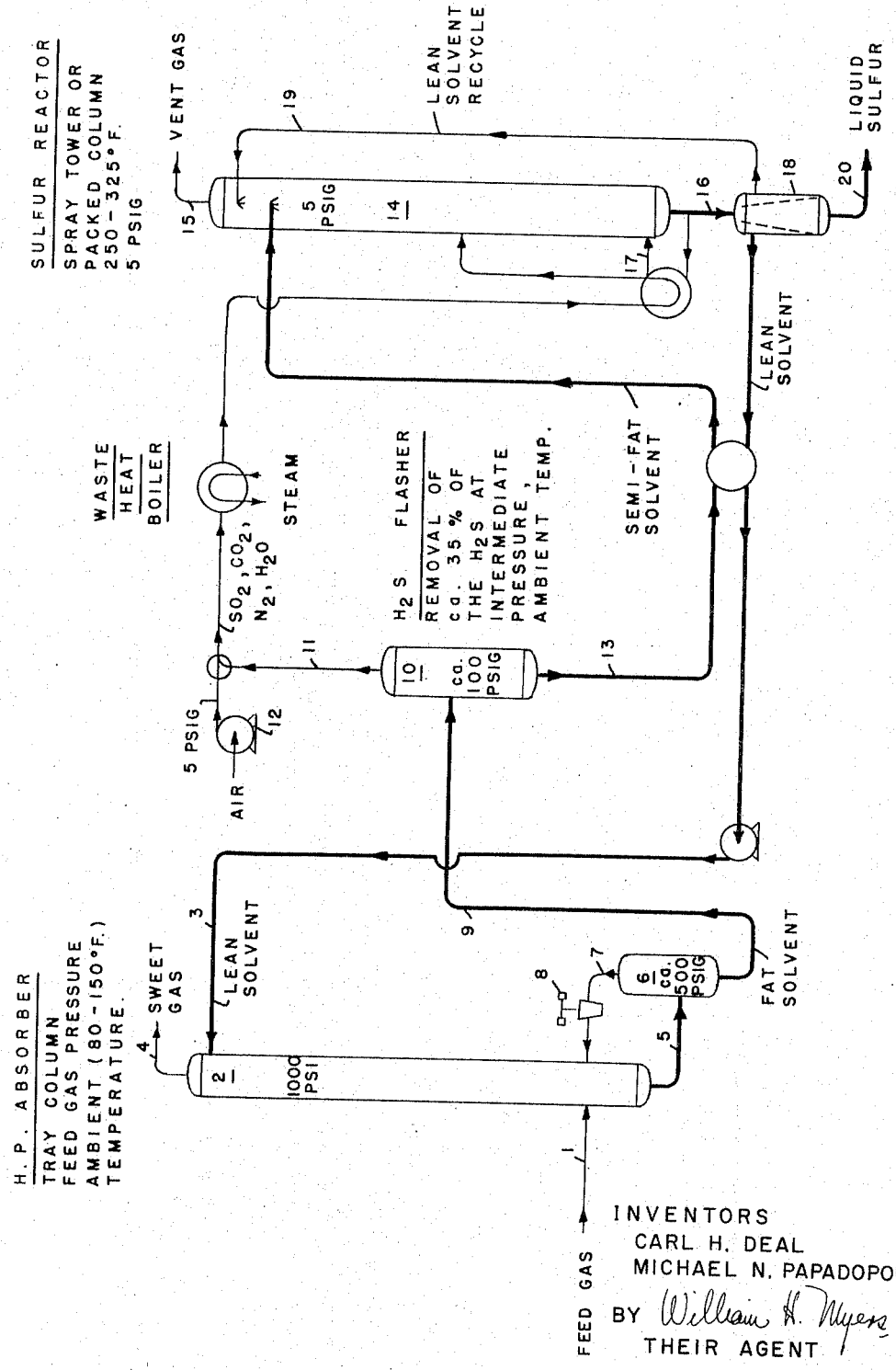

This is a continuation-in-part of application Ser. No. 190,160 filed Apr. 25, 1962.

This invention relates to the desulfurization of gaseous mixtures. More particularly, it relates to the separation of sulfur-containing acidic gases from gaseous mixtures by means of a selective absorbent combined with means for converting the sulfur-containing gases to sulfur in the same medium.

A number of methods have previously been proposed both for the purification of gaseous mixtures contaminated with such materials as hydrogen sulfide, carbonyl sulfide and the like as well as for the production of sulfur from oxidation of $H_2S$ or reaction between $H_2S$ and $SO_2$.

In most instances, the extractive methods for removal of hydrogen sulfide-containing gases from gaseous mixtures involve either "chemical solvents," e.g., alkanol amines and the like or "physical solvents" such as the glycols. Usually, these solvents are modified with substantial proportions of water. Conversion of the sulfur-containing gases to sulfur has been by such means as the Claus process or the process described in U.S. Patent 2,881,047, issued Apr. 7, 1959.

The latter of these two processes, although utilizing a combined extraction medium which also acts as a preferred medium of high absorption capacity and maximum reactivity for converting the absorbed gases to elemental sulfur, has not been entirely successful. The relatively low capacity of absorption of many of the prior art absorption media indicates obvious technical and economic disadvantages relative to the large amounts of solutions and aqueous systems which must be handled, treated and recycled as well as the heavy heat load on such systems since these large amounts of materials must be either heated or cooled to optimum operating conditions. Moreover, in almost all absorption media heretofore known the usual means for conversion of sulfur-containing gases to elemental sulfur is only partially successful since nothing less than complete conversion is satisfactory particularly from the viewpoint of air contamination or from the preparation of sulfur-free combustible gases and the like.

A number of problems have arisen in addition to those outlined above such as the thermal stability of many organic solvents; the differential temperature between that of the absorption column and any stripping columns; and the relative ineffectiveness of many absorption media, particularly for the removal of extremely high concentrations of sulfur-containing gases from the gaseous mixtures. A cardinal problem in all known applications wherein conversion to sulfur is accomplished simultaneously with absorption by the injection of $SO_2$ into the absorbent-reactant medium is the relatively low capacity of such media for $SO_2$.

It is an object of the present invention to overcome the disadvantages inherent in the use of previously known absorbents and conversion media. It is a particular object of the invention to provide a process for the removal of acidic gases over a wide range of partial pressures and subsequent conversion to elemental sulfur. It is a further object of the invention to provide a process for acid gas removal showing decreased energy requirements and higher process efficiency. Other objects will become apparent during the following detailed description of the invention.

Now, in accordance with the present invention, a highly improved and efficient process has been discovered comprising treating normally gaseous mixtures to eliminate acidic inorganic gaseous sulfur compounds therefrom and converting the same to sulfur wherein the improvement comprises utilizing as the principal absorbent and conversion medium a sulfone. It has also been found that the effectiveness of the sulfone is further enhanced when it is employed together with a minor proportion of water, an inorganic ferrous salt soluble in the sulfone-water mixture and a pyridine carboxylic acid chelating agent for ferrous ions. More specifically, the invention comprises in its preferred aspect the utilization of a medium comprising a cyclotetramethylene sulfone, water, a ferrous salt of a mineral acid and as a chelating agent for ferrous ions, a pyridine dicarboxylic acid.

The highly effective results are based in large part upon the high absorptive capacity of sulfones over glycols or aqueous glycols for $SO_2$. The following table of activity coefficients illustrates this.

LIMITING ACTIVITY COEFFICIENT OF $SO_2$ IN VARIOUS SOLVENTS AT AMBIENT TEMPERATURE

|        | Water | Glycols | Aqueous Glycols | Ketones | Sulfolane |
|--------|-------|---------|-----------------|---------|-----------|
| $SO_2$ | 13    | 1.0-3   | 2-6             | 0.7-1.2 | 0.2       |

Still more specifically, several preferred processes are contemplated within the generic concept of the invention. The first of these comprises the absorption from a sour gaseous feed of hydrogen sulfide, part of which is oxidized to sulfur dioxide which is then combined with the remaining $H_2S$ in the presence of the absorption gas conversion medium for conversion to sulfur, the lean solvent thus regenerated then being recycled to the initial absorption step.

A second preferred aspect of the invention comprises injection of the sour geaseous feed containing hydrogen sulfide into the presence of the above described absorption-conversion medium containing absorbed sulfur dioxide, withdrawal of sulfur so formed, oxidizing part of the sulfur to sulfur dioxide and recycling the sulfur dioxide thus formed back to the reactor section in the presence of the absorption-conversion medium.

A third preferred process coming within the scope of the present invention comprises absorbing hydrogen sulfide from a sour gaseous feed utilizing the above absorption-conversion medium, injecting $SO_2$ into the fat solvent to form sulfur, oxidizing part of the sulfur to $SO_2$ which is absorbed in the absorption-conversion medium and recycling the $SO_2$-medium back to the sulfur reactor.

FIGURES 1, 2 and 3, respectively, cover the essential equipment for carrying out each of these preferred processes.

The use of absorption-reaction medium comprising a major proportion (at least 50%, e.g., 70-98%, and preferably 80-90%) of a sulfone, results in essentially complete removal of sulfur-containing gases from the original gaseous mixtures with a minimum of equipment and energy expenditure. The iron salt acts as an outstanding catalyst for the ready conversion of sulfur compounds to elemental sulfur and the presence of the pyridine carboxylic acid chelating agent insures the maintenance of a high degree of activity and stability for the iron catalyst.

The iron catalyst comprises any inorganic ferrous salt soluble in the sulfone-water medium; thus, this may be ferrous sulfate, which is preferred, or ferrous chloride, ferrous nitrate and the like as well as mixtures thereof. The ferrous salt should be present in an amount of about 0.1–10% and preferably 0.5–5% by weight based on the total conversion-absorption medium.

The sulfones which may be utilized in accordance with this invention comprise any organic sulfone which is liquid at the temperature of absorption and conversion as conducted in the present invention, and which is miscible with water in the proportions utilized herein. While cyclotetramethylene sulfones are preferred, any sulfone having at least 3 carbon atoms per molecule and preferably 4–12 carbon atoms per molecule may be utilized. The organic radicals attached to the sulfone radicals may be a single radical, such as a carbocyclic ring, e.g., cyclotetramethylene or may be two organic radicals, preferably hydrocarbyl radicals having at least 2 carbon atoms each. While the hydrocarbyl (including di-hydrocarbyl) sulfones are preferred, other stable sulfones not adversely affected by the heat and chemical conditions present in the system may be utilized such as hydroxy-amino- or keto-sulfones. Typical dihydrocarbyl sulfones include methyl ethyl sulfone, diethyl sulfone, dinormal propyl sulfone, dibenzyl sulfone, and ditolyl sulfone.

The preferred class comprises sulfones based upon cyclotetramethylene sulfones, the preferred species being sulfolane, otherwise referred to as thiophene, tetrahydro-1,1-dioxide. Suitable modifications or derivatives of the preferred compound include 2-sulfolene; 2,3 - dimethyl cyclotetramethylene sulfone; 2,4-dimethyl cyclotetramethylene sulfones, 2,5-dimethyl cyclotetramethylene sulfone; 3-ethyl cyclotetramethylene sulfone; 2-methyl-5-propyl cyclotetramethylene sulfone as well as their analogs and homologs which are miscible with the amount of water present under the conditions of the process as described herein. Those sulfones preferably comprise about 70–95% by weight of the absorption-reaction medium. It is preferred that the number of alkyl radicals not exceed 4 and still more preferably that no more than 2 alkyl substituents be appended to the cyclotetramethylene sulfone ring.

The gas mixtures to be treated in accordance with this invention include flue gas, refinery gas, or natural gas as well as other gaseous mixtures containing or comprising major or minor proportions of sulfur-containing gases, particularly hydrogen sulfide, sulfur dioxide or carbonyl sulfide. The particular advantage of the combined absorbent utilized in accordance with this invention lies in its extremely high efficiency of absorption under a wide range of partial pressures of acid gases combined with its low heat requirement for regeneration as well as stability under the conditions of oxidative sulfur performed at one stage in the process under consideration. A typical natural gas of high acid gas content which may be treated according to the process of the invention has the following compositions.

| Component | Volume, percent |
|---|---|
| Hydrogen sulfide | 31.48 |
| Carbon dioxide | 7.10 |
| Nitrogen | 4.52 |
| Methane | 50.35 |
| Ethane | 2.16 |
| Propane | 0.74 |
| Isobutane | 0.23 |
| Normal butane | 0.41 |
| Isopentane | 0.31 |
| Normal pentane | 0.39 |
| Hexanes | 0.53 |
| Heptanes and higher | 1.78 |

While the process of the invention may be utilized for the extraction of such highly acid gases as that exemplified above, it also may be employed for the treatment of gases wherein the acid content is lower, such as a refinery gas having the following typical composition:

| Component | Volume, percent |
|---|---|
| Hydrogen sulfide | 7.5 |
| Carbon dioxide | 1.3 |
| Nitrogen | 23.0 |
| Hydrogen | 20.1 |
| Methane | 43.0 |
| Ethane | 3.3 |
| Propane | 0.8 |
| Isobutane | 0.3 |
| Normal butane | 0.2 |
| Pentanes and higher | 0.5 |

The proportion of water which will be present in the absorbent-conversion media of this invention may vary from about 2% to about 20% by weight of the total composition. The high activity of the ferrous catalyst present in the absorption-conversion mixture is maintained by the presence of minor amounts of a pyridine carboxylic acid capable of forming a relatively stable complex with ferrous ions, i.e., acids having a $pK_d$ in the range of 0.2 to 10 at 30 to 300° F. ($pK_d = -\log$ of dissociation constant $K_d$). Species illustrating these classes of potential chelating agents for iron are as follows:

Picolinic acid
Nicotinic acid
Isonicotinic acid
Lutidinic acid
Dinicotinic acid

The pyridine carboxylic acid chelating agent can be utilized in the form of its free acid or sodium salt although the free acid form will in all probability be utilized. It should be present in an amount between about 0.1% and about 5% based on the total composition and still more preferably in a mole ratio between about 0.1 and about 1 relative to the moles of ferrous ion present. The pH of the system will normally be between about 0 and 8 for most effective conversion of sulfur compounds to elemental sulfur under the operation conditions contemplated.

The invention will be illustrated by reference to the figures attached. Reference is made to FIGURE I wherein a sour feed gas comprising low molecular weight hydrocarbon gases contaminated with hydrogen sulfide is introduced from a source 1 into a high pressure absorber 2 at a pressure of about 100 to about 1500 p.s.i. and preferably about 1000 p.s.i. and at a temperature between about 80 and 150° F. Therein, it is passed countercurrently against a lean solvent comprising 95% sulfolane, 4% water, 0.5% ferrous sulfate and 0.5% pyridine dicarboxylic acid. The lean solvent is introduced by means of line 3 into absorber 2. The sweet gas exits from the absorber by means of line 4 while the fat solvent leaves the bottom of the absorber by means of line 5 and enters a light hydrocarbon flasher 6 wherein the pressure is reduced to about 500 pounds per square inch. Light hydrocarbons thus flashed off are circulated by means of line 7 through the repressurizer 8 to the high pressure absorber 2.

The fat solvent then proceeds by means of line 9 to the $H_2S$ flasher 10 wherein pressure is reduced to about 100 p.s.i.g. in order to flash off about 35% of the $H_2S$ which exits from the flasher by means of line 11. Air is introduced from a source 12 in order to react with $H_2S$ and form $SO_2$, preferably at a reduced pressure in the order of 5 p.s.i.g. In one method, the mixture is heat exchanged against steam in order to raise the temperature to about 250–325° F. before it reaches the sulfur reactor 14. The partially flashed fat solvent proceeds from the $H_2S$ flasher 10 by means of line 13 to the sulfur reactor 14 wherein $SO_2$ and $H_2S$ react to form elemental sulfur, the inert gases, ($CO_2$, $N_2$ and water) being vented by means of line 15. The amount of water vented is essentially equivalent to that formed in the course of the reaction.

Under the temperature conditions existing in reactor 14, (250–325° F.), the sulfur is in liquid form and is withdrawn together with lean solvent from the bottom of the sulfur reactor by means of line 16, passing to a separator 18. A minor proportion of the lean solvent is recycled by means of line 19 through the sulfur reactor 14 while the major proportion is sent back to the high pressure absorber 2 by means of line 3 for reuse.

An alternative method to the formation of liquid sulfur in sulfur reactor 14 may be carried out under somewhat lower reaction temperatures. The reactants ($SO_2$ and $H_2S$) entering reactor 14 at temperatures ranging from ambient to the melting point of sulfur (about 230–250° F.) react to form a precipitate of crystalline sulfur which can then be recovered by conventional means such as filtration, water can then be separated from the lean solvent and the lean solvent recycled as above.

The temperature at which the sulfur is formed and recovered is not critical but as a matter of expediency of process operation, apparatus used, physical form desired, etc. Temperatures ranging from ambient up to 325° F. are within the preferred range; however, higher or lower temperatures may be used without departing from the scope of the invention.

A preferred arrangement of apparatus for forming elemental sulfur in the presence of inert gaseous components of the sour feed gas is shown in FIGURE II, wherein the sour feed gas comprising gaseous hydrocarbons contaminated with substantial proportions of hydrogen sulfide is introduced from a source 21 into a thionizer 22 at a pressure of about 100 to about 1500 p.s.i. and preferably about 1000 p.s.i. and a temperature of about 80–250° F. wherein it is contacted with the absorbent reaction medium comprising 95% sulfolane, 4% water, 0.5% ferrous sulfate and 0.5% pyridine dicarboxylic acid containing absorbed sulfur dioxide which enters from line 23.

Under these conditions, elemental sulfur forms and a sweet dry gas exits from the top of the thionizer by means of line 24. The absorbent reaction medium and sulfur leave the bottom of the thionizer by means of line 25 and are separated in vessel 26, the sulfur being removed by means of line 27. About ⅔ of this sulfur is sent to storage by means of line 28 while about ⅓ is passed by means of line 29 to contact with air (or other oxygen source) from source 30 whereby sulfur dioxide is formed and sent to an $SO_2$ absorber 31.

The lean solvent removed from the solvent-sulfur separator 26 contains water of reaction and hence is sent by means of line 32 to the water flasher 33 wherein an amount of water substantially equivalent to that formed in the thionizer is flashed and removed through line 34. Part of the lean solvent recovered in this operation is sent by means of line 35 to the $SO_2$ absorber 31, while another part of the lean solvent is recycled to the thionizer 22 by means of line 36 without passing through the $SO_2$ absorber. The $SO_2$ fat solvent leaves the $SO_2$ absorber and is sent via line 23 to the thionizer 22 for further sulfur formation with hydrogen sulfide.

A third preferred process is shown in FIGURE III. A sour feed gas from a source 41 is sent to a high pressure absorber 42 wherein it is passed countercurrent to the solvent comprising sulfolane, water, ferrous sulfate and pyridine dicarboxylic acid in essentially the concentrations referred to hereinbefore and under the temperature and pressure conditions utilized in the process of FIGURE I. This results in the absorption of hydrogen sulfide from the feed gas and the separation of sweet dry fuel gas by means of line 43. The fat solvent now containing $H_2S$ exits from the absorber 42 by means of line 44 which carried it to the sulfur reactor 45. Therein the $H_2S$ reacts with sulfur dioxide, carried to it by the fat solvent in line 46 to be referred to hereinafter. The reactor is fitted with a vent 47 for $CO_2$ which may have been introduced at other points in the system during the air oxidation of $H_2S$ to $SO_2$.

The reaction mixture is then sent by means of line 48 to the sulfur-solvent separator 49 wherein sulfur is removed by means of line 50, part of it being sent to storage and the remainder being reacted with air (or other oxygen source) from a source 51 in line 52. The sulfur dioxide so formed is then sent to the $SO_2$ absorber 53 from which nitrogen (introduced as part of the air) is vented through line 54, the sulfur dioxide being absorbed in the sulfolane-water medium containing ferrous sulfate and pyridine dicarboxylic acid. The fat solvent is then recycled from the bottom of the $SO_2$ absorber to the sulfur reactor by means of line 46. Lean solvent separated in separator 49 contains water of reaction and is sent by means of line 55 to water flasher 56 wherein water of reaction is removed by means of vent 57, the lean solvent recovered from this operation being sent by lines 58 and 59 back to the absorber 42, or alternatively, by lines 58 and 60 to the $SO_2$ absorber 53.

We claim as our invention:

1. In a process for treating a sour normally gaseous mixture containing hydrogen sulfide whereby hydrogen sulfide is removed from the mixture and converted to sulfur, the steps comprising:
    (a) intimately contacting the sour mixture with an absorbent-reaction medium comprising by weight 70–98% of an organic sulfone, 2–20% water, 0.1–10% ferrous salt and 0.1–5% of a pyridine carboxylic acid at a temperature of about 80–150° F. and at a pressure of about 100 to 1500 p.s.i., whereby hydrogen sulfide is extracted by the medium from the mixture and a sweet gas is separated;
    (b) injecting sulfur dioxide into the hydrogen sulfide rich absorbent-reaction medium and
    (c) maintaining the reaction mixture so formed at temperatures ranging from ambient to 325° F. whereby sulfur and water are formed;
    (d) separating sulfur from the absorbent-reaction medium and water formed in step (c);
    (e) separating an amount of water from the absorbent-reaction medium substantially equivalent to that formed in step (c);
    (f) and recycling the now lean absorbent-reaction medium to step (a).

2. The process according to claim 1 wherein the absorbent reaction medium contains 70–95% by weight of a cyclotetramethylene sulfone.

3. The process according to claim 2 wherein the sulfone is sulfolane.

4. The process according to claim 1 wherein the pyridine carboxylic acid is pyridine dicarboxylic acid.

5. The process according to claim 1 wherein the ferrous salt is ferrous sulfate.

6. The process according to claim 1 wherein a portion of the $H_2S$ is flashed from the $H_2S$-rich absorbent and oxidized to form $SO_2$ for use in steps (b) and (c).

7. The process for separating hydrogen sulfide from sour normally gaseous mixture and conversion thereof to sulfur which comprises the steps of:
    (a) intimately contacting the sour gas with an absorbent solution comprising by weight 2 to 20% water, 70–95% sulfolane, 0.5–5% of a ferrous salt and 0.1–5% pyridine dicarboxylic acid at a pressure of about 100 to 1500 p.s.i., and at a temperature of 80 to 150° F. whereby hydrogen sulfide is absorbed in said solution and sweet gas is separated therefrom;

(b) flashing a portion of absorbed hydrogen sulfide from the fat solution and oxidizing it to sulfur dioxide, (c) passing the sulfur dioxide and partially flashed fat solution to a reactor maintained at 250–325° F. wherein hydrogen sulfide and sulfur dioxide react to form water and liquid sulfur, (d) venting an amount of water substantially equivalent to that so formed;

(e) separating sulfur from the thus regenerated solution, and (f) recycling the regenerated solution to step (a).

8. The process for separating hydrogen sulfide from sour normally gaseous mixtures and conversion thereof to sulfur which comprises the steps of:

(a) intimately contacting the sour gas with sulfur dioxide in the presence of an absorbent conversion medium comprising by weight 2–20% water, 70–95% sulfolane, 0.5–5% of a ferrous salt and 0.1–5% pyridine dicarboxylic acid at a pressure of about 100 to 1500 p.s.i. and at a temperature of about 80–250° F., whereby sulfur and water are formed;

(b) separating sweet gas from the reaction mixture;

(c) separating sulfur from the absorbent conversion medium and water formed in step (a);

(d) separating an amount of water from the conversion medium substantially equivalent to that formed in step (a);

(e) oxidizing a portion of the sulfur separated in step (c) to sulfur dioxide;

(f) recycling the sulfur dioxide and regenerated absorbent conversion medium from step (d) back to step (a) for further contact with sour gas.

9. The process for separating hydrogen sulfide from sour normally gaseous mixtures and conversion thereof to sulfur which comprises the steps of:

(a) intimately contacting the sour gas mixture with an absorbent-reaction medium comprising by weight 2–20% water, 70–95% sulfolane, 0.5–5% of a ferrous salt and 0.1–5% pyridine dicarboxylic acid at a pressure of about 100 to about 1500 p.s.i. and at a temperature of about 80 to 150° F. whereby hydrogen sulfide is absorbed in said solution and sweet gas is separated therefrom;

(b) oxidizing sulfur with air, whereby a mixture of sulfur dioxide and inert gaseous air components is formed;

(c) absorbing the sulfur dioxide in a separate portion of the medium of step (a), at ambient pressure whereby the inert air components are separated therefrom;

(d) combining the sulfur dioxide-containing medium and hydrogen sulfide-containing medium at a temperature ranging from ambient to 325° F. whereby sulfur dioxide and hydrogen sulfide react to form sulfur and water;

(e) separating the sulfur thus formed from the medium;

(f) flashing an amount of water from the medium substantially equivalent to that formed in step (d);

(g) recycling portions of the medium to steps (a) and c).

References Cited
UNITED STATES PATENTS

| | | | |
|---|---|---|---|
| 2,385,704 | 9/1945 | Hooker et al. | 23—2 X |
| 3,023,088 | 2/1962 | Urban et al. | 23—226 |
| 3,039,251 | 6/1962 | Kamlet | 23—2 X |
| 3,065,059 | 11/1962 | Redlich | 23—225 |
| 3,068,065 | 12/1962 | Hartley et al. | 23—2 |
| 3,284,162 | 11/1966 | Deal et al. | 23—226 |

OSCAR R. VERTIZ, *Primary Examiner.*

A. J. GREIF, *Assistant Examiner.*